United States Patent [19]
Schick et al.

[11] Patent Number: 5,970,053
[45] Date of Patent: Oct. 19, 1999

[54] METHOD AND APPARATUS FOR CONTROLLING PEAK FACTOR OF COHERENT FREQUENCY-DIVISION-MULTIPLEXED SYSTEMS

[75] Inventors: Darryl Richard Schick, King of Prussia; Mark Anthony Zlotnik, Hatboro; Edward James McQuillen, Jr., Norristown; Richard Andrew Zadrejko, King of Prussia, all of Pa.

[73] Assignee: RDL, Inc., Conshohocken, Pa.

[21] Appl. No.: 08/772,800

[22] Filed: Dec. 24, 1996

[51] Int. Cl.$^6$ ............................... H04I 15/00; H04I 12/28
[52] U.S. Cl. ..................... 370/252; 370/436; 370/329; 375/208; 375/325; 375/326; 455/324; 455/303
[58] Field of Search ...................... 375/325, 271, 375/275, 279, 280, 302, 303, 308, 329, 335; 370/485, 486, 487, 482, 483, 484, 503, 516, 480, 481

[56] References Cited

U.S. PATENT DOCUMENTS

| | | | |
|---|---|---|---|
| 5,230,099 | 7/1993 | Loper | 455/324 |
| 5,579,338 | 11/1996 | Kojima | 375/208 |
| 5,719,867 | 2/1998 | Borazjani | 370/436 |

*Primary Examiner*—Michael Horabik
*Assistant Examiner*—Man Phan
*Attorney, Agent, or Firm*—Joseph M. Konieczny; John F. A. Earley; Harding, Earley, Follmer & Frailey

[57] ABSTRACT

A system is disclosed which can measure and control the absolute phase angles of individual coherent Frequency-Division-Multiplexed (FDM) carriers which have been combined to form a composite signal. User-specified phase relationships for the carriers are predetermined to produce an optimum peak factor (peak power to average power ratio) of the composite signal for a given application. In the preferred embodiment, phase relationships chosen to minimize peak factor can dramatically reduce the presence of intermodulation distortion products which can be detrimental to present communication architectures, such as Community Antenna Television (CATV). As CATV providers move toward using fiber-optic transmission networks for support of larger customer bases and inclusion of digital channels, there is a greater risk for rising signal amplitudes to induce clipping of CATV laser transmitters, thereby creating distortion which degrades analog picture quality and causes digital transmission errors to exceed maximum thresholds. Higher peak factors may be desirable, however, when testing individual components including CATV amplifiers, or subsystems such as linear fiber-optic transmission equipment, in order to more accurately characterize field performance. The disclosed invention uses a combination of RF, baseband, and digital techniques to repeatedly acquire and maintain desired peak factor conditions within coherent FDM systems.

16 Claims, 11 Drawing Sheets

METHOD AND APPARATUS FOR CONTROLLING PEAK FACTOR OF COHERENT FREQUENCY-DIVISION-MULTIPLEXED SYSTEMS

BACKGROUND OF THE INVENTION

An ideal amplifier can be defined as one which, when given an input signal having virtually infinite amplitude, would respond with a perfectly linear output transfer curve. It is doubtful that any method of amplification will ever boast this level of performance. For that reason, most designers are acutely aware that inherent nonlinearities of amplifiers and fiber-optic links are a major source of both noise and distortion, especially when input signals cover a wide dynamic range. This condition is of particular concern within systems developed for Community Antenna Television (CATV) headend applications.

As CATV channels are added to a headend composite signal, the number and level of Intermodulation Distortion (IMD) products increases. Furthermore, video carriers of most headends are non-coherent, or free-running, allowing for their combined peak voltage to continually vary over a potentially large range. Consequently, peak distortion levels will rise and fluctuate since unwanted IMD levels are principally a function of the composite signal's voltage envelope as opposed to its average voltage.

In an effort to reduce the visible effects of IMD products, in particular Composite Triple Beat (CTB) and Composite Second Order (CSO) distortions, the use of harmonically related frequency plans was introduced for analog video applications. One such frequency plan, known as the Harmonically Related Carrier (HRC) plan, is defined by frequencies, $Fc_i$, which are consecutive integral multiples of a 6 Megahertz (MHz) fundamental frequency. Specifically, for an 83-channel HRC system:

$$Fc_i = (i \times 6) \text{ MHz} \quad (1)$$

where; Harmonic subscript i=9 through 91.

Equally as important, the HRC plan specifies that frequencies be phase locked, or coherent. The use of coherent HRC frequencies forces all related CTB and CSO distortion products to precisely overlap the carriers thereby contributing a still unwanted, although fixed, amplitude and phase offset onto the HRC signals. While IMD products become stabilized and less perceivable within the analog video picture, the peak amplitude of the combined HRC signals can still reach disturbing levels depending on the random distribution of their relative phase angles. These higher amplitudes, unfortunately, intensify the risk of amplifier/transmitter clipping to be described hereinafter. It should also be mentioned that the effects of such IMD products on non-analog video signals, such as digitally modulated carriers, may not be improved at all when utilizing the HRC plan.

CATV service providers such as Multiple Systems Operators (MSOs) currently employ more popular carrier frequency schemes which adopt either the Standard or Incrementally Related Carrier (IRC) plan. Like the HRC plan, nominal carrier frequencies of the alternate plans are related by a common, although much lower, fundamental frequency. Unlike the HRC plan, however, the frequencies of the alternate plans are not consecutive integral multiples of their fundamental, and more importantly, the Standard plan frequencies are non-coherent. The result is a combined multi-carrier envelope having a peak amplitude that is non-stationary with time and which could potentially enter the non-linear regions of headend amplifiers or fiber-optic links within the related system, thereby creating unwanted IMD products. To compensate, MSO technicians will sometimes decrease amplifier output levels in order to reduce IMD. This practice must be performed carefuilly so as to avoid undue compromise of Carrier to Noise (C/N) ratios.

Recently, government deregulation of communication services has opened the door to direct competition among providers of video and telephony, which has sparked an aggressive search for the ultimate transmission network architecture. This network must be capable of supporting widespread services such as telecommuting and video conferencing as well as digital channels intended for cable modem, compressed digital video, and Internet access; hence presenting at least two new problems. First, to maintain compatibility with existing television receivers, digital services are being implemented in the frequency band above existing analog video channels. Uninterrupted digital service is governed by a predetermined Bit-Error-Rate (BER) as defined by error detection and correction algorithms known in the art. Unfortunately, IMD products created from existing analog carriers fall into the digital service spectrum thereby threatening BER thresholds. Secondly, as more MSOs switch to Hybrid Fiber Coaxial (HFC) networks to support a larger customer base, laser transmitter clipping influenced by peak amplitudes of the video carrier spectrum becomes a serious concern. It is unlikely that MSOs can continue to compensate by simply decreasing the operating level because of the inherent tradeoff with C/N ratios. Moreover, a minimum signal amplitude is necessary to properly set the Optical Modulation Index (OMI) of an HFC network's laser transmitter.

It is thus becoming increasingly apparent that better techniques for controlling the peak amplitude of the composite signal are essential if MSOs are to remain competitive by offering expanded services. One such method would be to establish and maintain an optimum phase relationship of coherent carrier signals. Phase relationships chosen such that coherent carrier signals combine destructively would minimize the carriers' contribution to the composite signal's voltage envelope thereby drastically reducing harmful IMD levels. Such a method has been previously described in U.S. Pat. Nos. 3,898,566 and 5,125,100 of Switzer, et al and Katznelson respectively, which are herein incorporated by reference.

While the methods of Switzer, et al and Katznelson reduce undesired IMD levels, each approach has notable weaknesses. Switzer, et al, for example, do not offer an automatic, closed-loop feedback solution. More particularly, Switzer, et al require manual adjustment of each carrier's phase angle. Given the many factors affecting system stability over time, this task can be tedious and prone to significant error. Furthermore, the level of system calibration required of the Switzer, et al method to obtain reasonable performance is not practical in most Frequency-Division-Multiplexed (FDM) applications where large numbers of carriers are involved.

The approach taken by Katznelson increments each carrier phase angle by a predetermined amount and then analyzes the system's output response through an off-line, non-linear device in order to resolve phase error values. This procedure depends on inducing distortion products which fall directly onto carrier signals; a condition not necessarily met with the more common Standard and IRC plans because of their non-consecutive integral harmonic frequencies. In addition, Katznelson's system relies on a series of controlled "auxiliary" tones having frequencies reaching five times that of the highest carrier which, when combined with carriers forming the composite signal, attempt to reduce peak amplitude levels for suppression of IMD. Unfortunately, headend amplifiers are not rated for such high frequency signals which would furthermore cause an unwanted increase in average power levels. The closed-loop system is complex and would require numerous iterations before convergence is observed.

A need still remains for a practical system and method of operation thereof which does not suffer these prior art deficiencies.

SUMMARY OF THE INVENTION

The present invention is directed toward a system and method of operation thereof which provides accurate phase-angle control of individual coherent carriers within an FDM system. In the preferred embodiment, generated carriers represent the video carriers of a modulated composite CATV headend signal. For illustration purposes only, the HRC plan is referenced throughout this document, however, applicable CATV carrier frequency plans include those defined by the National Telecommunication Standards Committee (NTSC), such as HRC, IRC, and Standard, as well as European plans such as PAL and SECAM.

The present invention allows a user to specify an absolute phase-angle relationship between each coherent carrier in the system. These absolute relationships define a unique interference pattern created as the vector sum of all related carriers, hence influencing the composite signal's overall voltage envelope. Characteristic IMD products can be significantly reduced by the selection of carrier phase angles which minimize the envelope's Peak Factor (PF), where;

$$PF = 20 \times \log\left(\frac{|\text{voltage}|_{peak}}{|\text{voltage}|_{average}}\right) dB \quad (2)$$

The invention comprises means for generating a plurality of coherent carrier signals using Direct Digital Synthesis (DDS) technology which grants precise control of each carrier signal's frequency and relative phase angle. With carrier frequencies chosen to represent those used within the CATV industry, the combined signals form a periodic composite waveform whose frequency matches that of the fundamental frequency from which the plan, such as HRC, was derived. Carrier signals are made coherent by clocking all DDS-based carrier generators from a common system reference oscillator.

The invention further comprises means for down-converting the composite Radio Frequency (RF) signal to a reduced Intermediate Frequency (IF) before digitizing the analog waveform into sampled data for analysis. Digital Signal Processing (DSP) algorithms are performed on the sampled data to determine the absolute phase angle of each coherent carrier signal. Measured phase angles are compared with user-supplied optimum values thereby producing error signals used to phase-adjust the respective DDS-based carrier generators. The data/process flow of the present invention is indicative of an automatic feedback control loop whose error signal approaches zero as actual phase angles converge toward desired values.

In contrast to the methods of Switzer, et al and Katznelson, the present invention offers a very simple and versatile solution for controlling the peak factor, and therefore IMD levels, within any coherent FDM system. More particularly, individual carrier phases are directly measured, then compared with optimal phase values to yield carrier phase adjustments consistent with convergence toward desired peak factor conditions. The wide use of digital technology by the present invention produces accurate and stable results within one to two iterations, simplifies process automation, and minimizes the need for extensive calibration procedures all lacking in the prior art.

DETAILED DESCRIPTION OF THE PREFERRED EMBODIMENT

Figure 1:
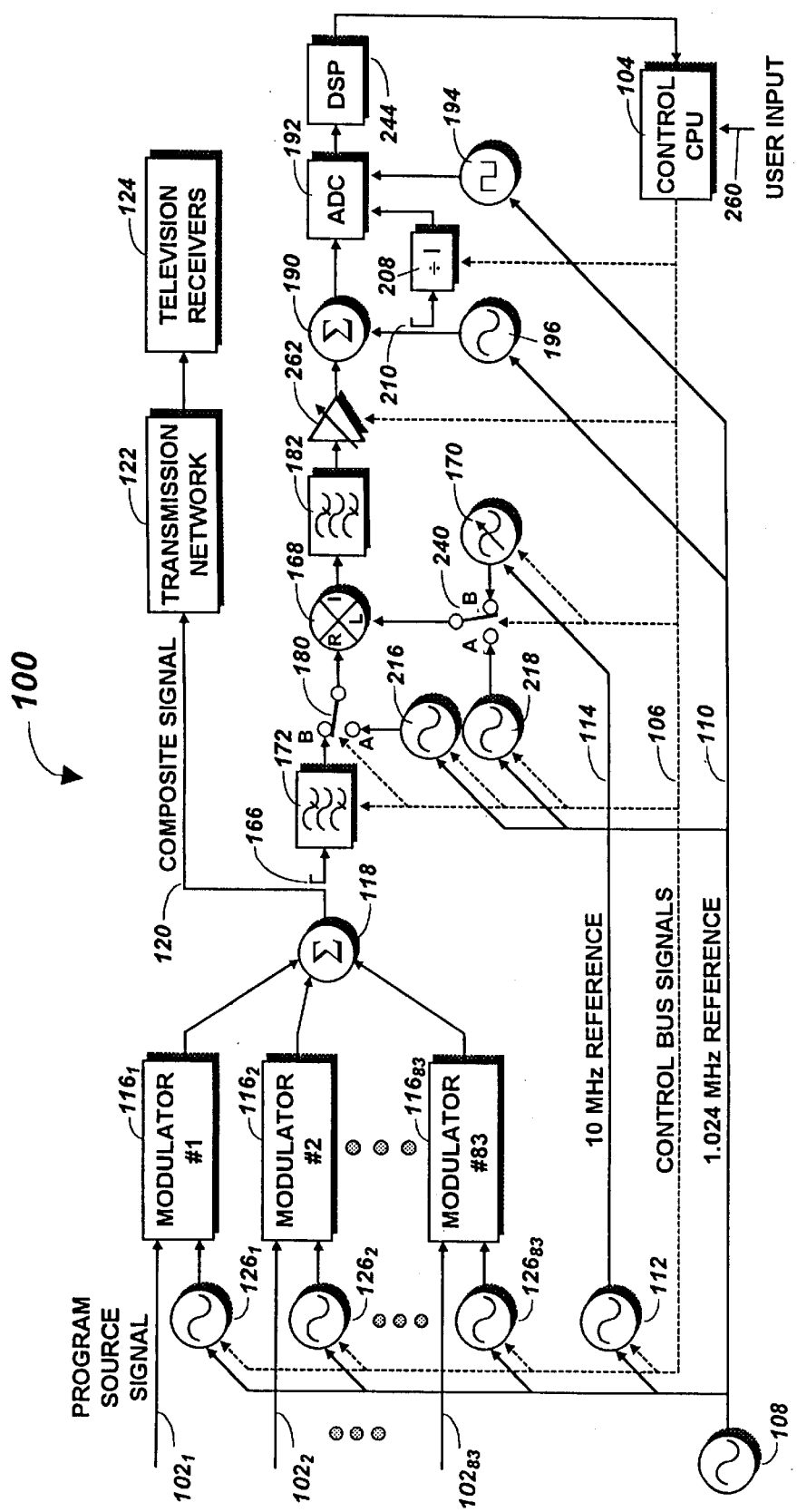
FIG. 1 is a system block diagram of the present invention configured in a typical CATV headend application.

With regard to the drawings, wherein like numeric references designate like parts throughout, there is shown in FIG. 1 a block diagram of a system 100 demonstrating the present invention used in a typical 83-channel CATV headend receiving program source signals $102_1, 102_2, \ldots 102_{83}$. The system 100 comprises a Central Processing Unit (CPU) 104 supplying control signals to numerous elements by means of a control bus 106, consisting of logic-level I/O and a standard IEEE parallel interface known in the art. The CPU 104, by means of the control bus 106, commands each of the connected elements in response to program routines being executed within. The system 100 further comprises two reference generators, 108 and 112, having typical frequencies of 1.024 MHz and 10 MHz, which provide synchronization between various elements by means of buses 110 and 114 respectively. Note that reference generator 112 (10 MHz) is synchronized to reference generator 108 (1.024 MHz) as indicated by the interconnection of bus 110.

Program source signals $102_1, 102_2, \ldots 102_{83}$ are received by system 100 from remote sources including cable, satellite dish, or antenna (not shown) and/or are generated locally by television cameras or video cassette recorders (not shown). Signals $102_1, 102_2, \ldots 102_{83}$ are baseband signals that contain each channel's video, audio, and color data along with vertical and horizontal synchronization information required for accurate reconstruction by a television receiver 124. Program source signals $102_1, 102_2, \ldots 102_{83}$ are up-converted by channel modulators, $116_1, 116_2, \ldots 116_{83}$ respectively, before being combined by a summer 118 thus forming a composite signal 120. Composite signal 120 is amplified and distributed within a Hybrid Fiber Coaxial (HFC) cable transmission network 122 before being received by individual television receivers 124. The signal path just described is characteristic of most CATV systems as outlined by Katznelson.

Channel modulators $116_1$, $116_2$, ... $116_{83}$ each receive a second signal from RF generators $126_1$, $126_2$, ... $126_{83}$, respectively, which provides the channel's coherent carrier frequency ($F_C$). Each modulated channel occupies a standard 6 MHz bandwidth [typically ($F_C$−1.25 MHz) to ($F_C$+ 4.75 MHz)]. With reference to expression (1), an 83-channel HRC frequency plan begins with the $9^{th}$ harmonic of 6 MHz (i.e. 54 MHz) and proceeds consecutively through the $91^{st}$ harmonic (i.e. 546 MHz). RF generators $126_1$, $126_2$, ... $126_{83}$, to be further described hereinafter with reference to FIG. 3, produce coherent HRC signals by employing a DDS device 128.

Figure 2:
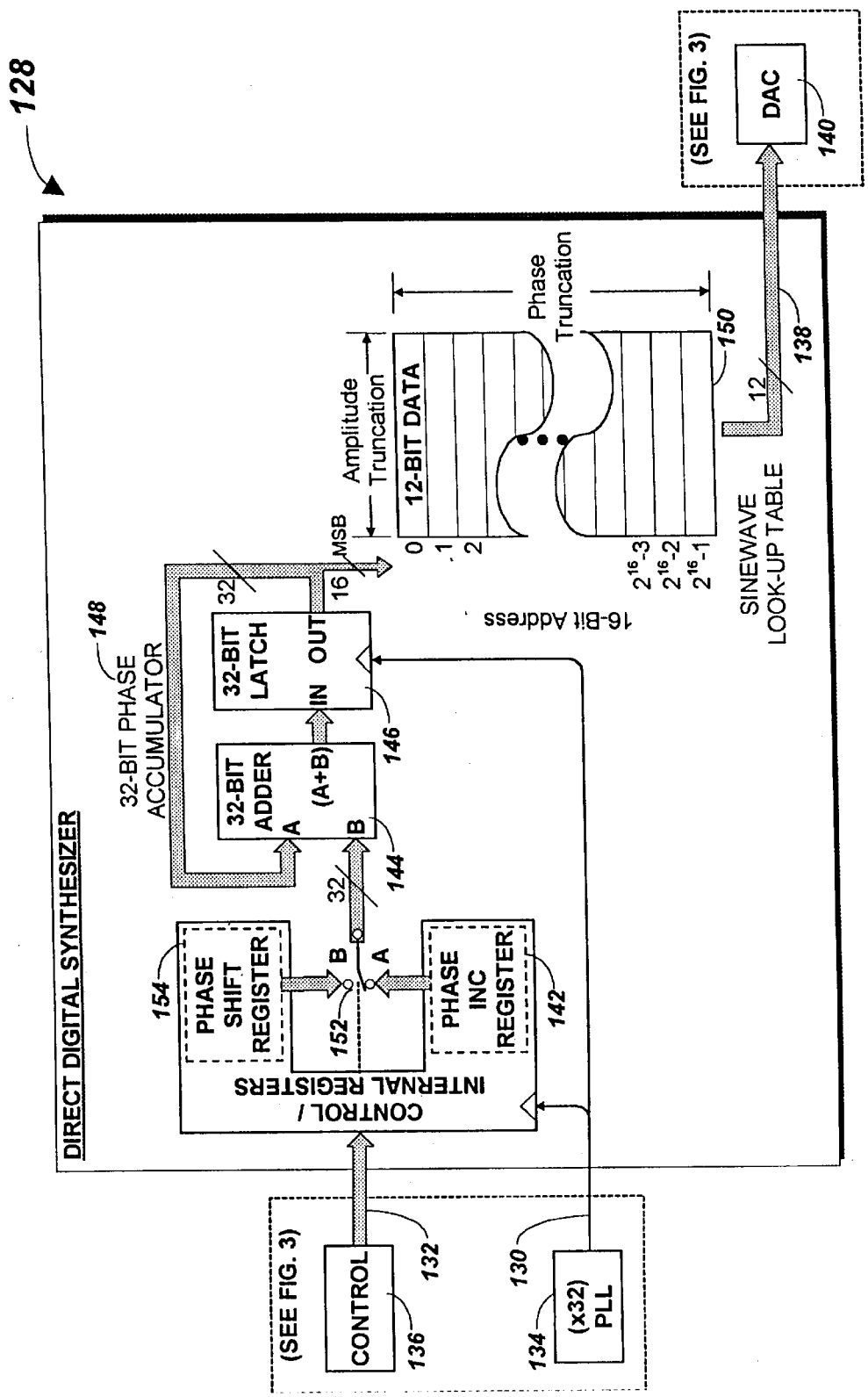
FIG. 2 is a functional block diagram of a DDS device.

The DDS device 128, functionally illustrated in FIG. 2, may be of the type made available by Qualcomm of San Diego, Calif. identified as Q2334 (Note that actual internal implementation can be quite different). In general, a DDS device receives a fixed external clock which gets divided down by a programmable amount to produce a digitized Continuous-Wave (CW) signal having an effective sampling rate matching that of the external clock frequency. The DDS device 128 receives, on signal path 130, a fixed external clock having a typical value of 32.768 MHz generated by a ×32 Phase-Lock-Loop (PLL) stage 134 receiving the 1.024 MHz system reference 108, thus theoretically limiting the DDS output frequency to 16.384 MHz (per Nyquist criteria to be further described hereinafter).

Figure 4:
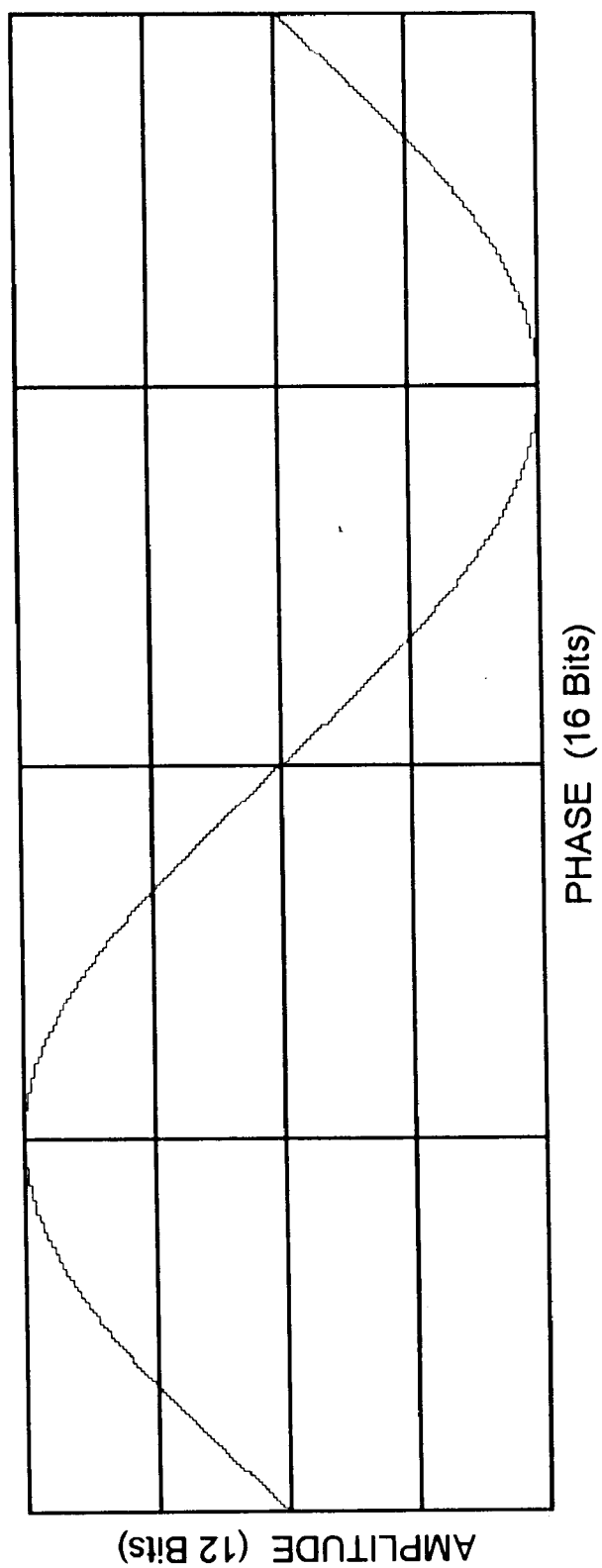
FIG. 4 graphically illustrates the internal sine wave look-up table of the DDS device of FIG. 2.

With the electronic switch 152 of FIG. 2 in position "A", each period of the external clock present on signal path 130 causes a predetermined amount loaded into the phase increment register 142, via a control interface 132, to be summed into a 32-bit adder 144, by way of input "B". The resultant sum (A+B) provides the input to a 32-bit latch 146, the output of which is fed back to the adder 144 by way of input "A", consequently forming a 32-bit phase accumulator 148. The 16 Most-Significant-Bits (MSBs) of the phase accumulator's (148) 32-bit sum supply the address for a sine wave look-up table 150 containing normalized 12-bit amplitude data for one complete period as illustrated in FIG. 4. The corresponding data on signal path 138, as applied to a Digital-to-Analog Converter (DAC) 140, is representative of a digitized CW signal whose frequency ($F_{CW}$) is related to the frequency of the external clock ($F_{CLK}$) on signal path 130 and the phase increment register value ($\Delta\phi$) by the following expression:

$$F_{CW} = \left(\frac{F_{CLK} \times \Delta\phi}{2^{32}}\right) \text{Hertz} \quad (3)$$

As previously described, the value stored within the phase increment register 142 supports user-control of the DDS device's 128 output frequency represented digitally on signal path 138. User-specified carrier frequencies received by the CPU 104 via signal path 260 (see FIG. 1) are subsequently processed to determine the appropriate phase increment register 142 values. The DDS device 128 also features a phase shift register 154 whose value can be used in a one-time phase accumulation by locating the electronic switch 152 to position "B" for one period of the external clock present on signal path 130. The net effect will bring about a relative change in the synthesized signal's phase, without altering its frequency. These are unique advantages that DDS technology, as functionally illustrated in FIG. 2, offers over analog synthesis techniques. More particularly, DDS technology provides the ability to accurately and precisely control both the frequency and phase of a harmonically pure digital representation of a CW signal.

Figure 3:
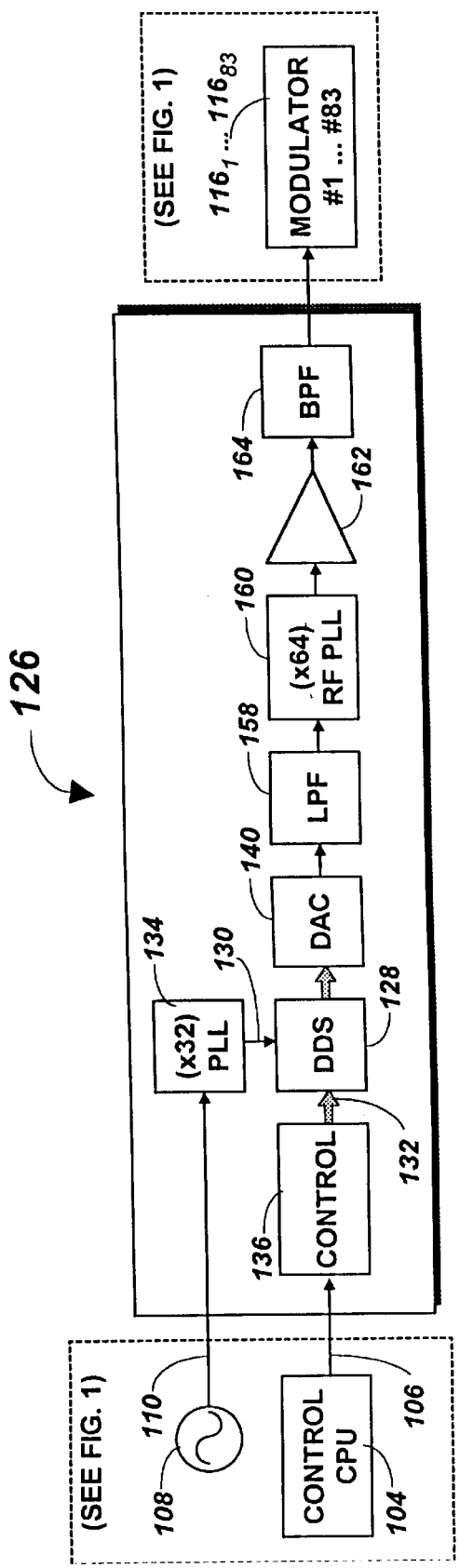
FIG. 3 is a block diagram of the DDS-based RF generator used by the present invention to provide RF carrier signals.

The high-speed DAC 140 shown in FIG. 3 transforms the DDS 128 digital output to its equivalent analog form. However, since the sine wave look-up table 150 of FIG. 2 does not have infinite depth or length, the synthesized signal experiences amplitude and phase quantizing error respectively, resulting in "spurs". To compensate, a Low Pass Filter (LPF) 158 follows the DAC 140 to reduce spur amplitudes as well as those of any aliased images, known in the art, created by the conversion process of the DAC 140. An RF PLL 160 then multiplies the frequency of the filtered signal by 64, making the RF generator 126 capable of producing frequencies satisfying expression (1). The output of the RF PLL 160 subsequently passes through an amplifier 162 and Band-Pass Filter (BPF) 164 stage. Note that the pass-band of the BPF 164 stage may need to be uniquely specified for each RF generator $126_1$, $126_2$, ... $126_{83}$ frequency. The output of the BPF 164 serves as the output of the associated RF generator $126_1$, $126_2$, ... $126_{83}$ that is applied to the respective channel modulator $116_1$, $116_2$, ... $116_{83}$ as shown in FIG. 1.

The composite signal 120, formed as the summation of all outputs of modulators $116_1$, $116_2$, ... $116_{83}$ through the combiner 118, feeds a directional coupler 166. The coupler's 166 through output supplies the input to the transmission network 122, whereas the tap output of coupler 166 provides the signal to be analyzed by the present invention. Since the carrier frequencies supplied to the modulators $116_1$, $116_2$, ... $116_{83}$ from the RF generators $126_1$, $126_2$, ... $126_{83}$, respectively, remain unchanged by the modulation process, the carrier components of 83 HRC channels included within the composite signal 120 can be mathematically represented as:

$$S_{RF}(t) = \sum_{i=9}^{91} A_i \cos(\omega_i t + \theta_i) \quad (4)$$

where $$\omega_i = 2\pi(i \times 6 \times 10^6) \quad (5)$$

The independent variable (t) is common to all carriers since the RF generators $126_1$, $126_2$, ... $126_{83}$ are phase-locked to the common system reference 108.

In general, the signal analysis portion of the present invention involves the measurement of the carrier phase constants, $\theta_i$, of expression (4) by executing Digital Signal Processing (DSP) algorithms on sampled data. As is known in the art, Nyquist theory states that in order to preserve all frequency information when digitizing a continuous-time signal, the minimum sampling rate should be at least twice that of the highest frequency component of the signal being sampled. For the multi-carrier signal $S_{RF}(t)$ of expression (4) (i.e. combined carriers within composite signal 120), a sampling rate nearing 1.1 Gigahertz (GHz) (i.e. 2×546 MHz) would be required. It is beneficial to down-convert $S_{RF}(t)$ to a more manageable composite IF signal, $S_{IF}(t)$. Down conversion is performed by the mixer 168 used in conjunction with a variable LO signal, $S_{LO}(t)$, supplied by generator 170 (such as Hewlett-Packard model $HP_{8656}B$). This process results in a mixing, or multiplication, of signal $S_{RF}(t)$ with that of LO signal $S_{LO}(t)$, thereby producing signal $S_{IF}(t)$ at the output of the mixer 168, which can be expressed mathematically as:

$$S_{IF}(t) = S_{RF}(t) \times S_{LO}(t) \quad (6a)$$

$$= \sum_{i=9}^{91} \left(\frac{A_i \times A_{LO}}{2}\right)[\cos((\omega_i - \omega_{LO})t + \theta_i - \theta_{LO}) + \cos((\omega_i + \omega_{LO})t + \theta_i + \theta_{LO})] \quad (6b)$$

Each carrier component of signal $S_{RF}(t)$ (within composite signal 120), when mixed with $S_{LO}(t)$ (output of signal generator 170), creates a pair of product terms, commonly referred to as the upper and lower sidebands, representing the argument sum and difference of the two cosine (argument) factors. Either sideband term contains all signal information regarding the related carrier as it exists within the composite signal 120. It is therefore possible to analyze the entire RF bandwidth within a much lower IF bandwidth simply by tuning the frequency of $S_{LO}(t)$ and inspecting only the lower sideband terms. In the present invention, $S_{LO}(t)$ tuning is performed remotely via an IEEE-488 bus which connects the LO signal generator 170 with the control CPU 104 by way of control bus 106.

It is important that $S_{LO}(t)$ be phase-locked with the carrier components of $S_{RF}(t)$. This is accomplished by supplying the LO signal generator 170 with the 10 MHz reference 112 applied thereto via signal path 114. The 10 MHz reference is itself phase-locked to the 1.024 MHz system reference 108 as are the RF generators $126_1$, $126_2$, ... $126_{83}$ responsible for producing the carrier components as previously discussed.

Figure 5:
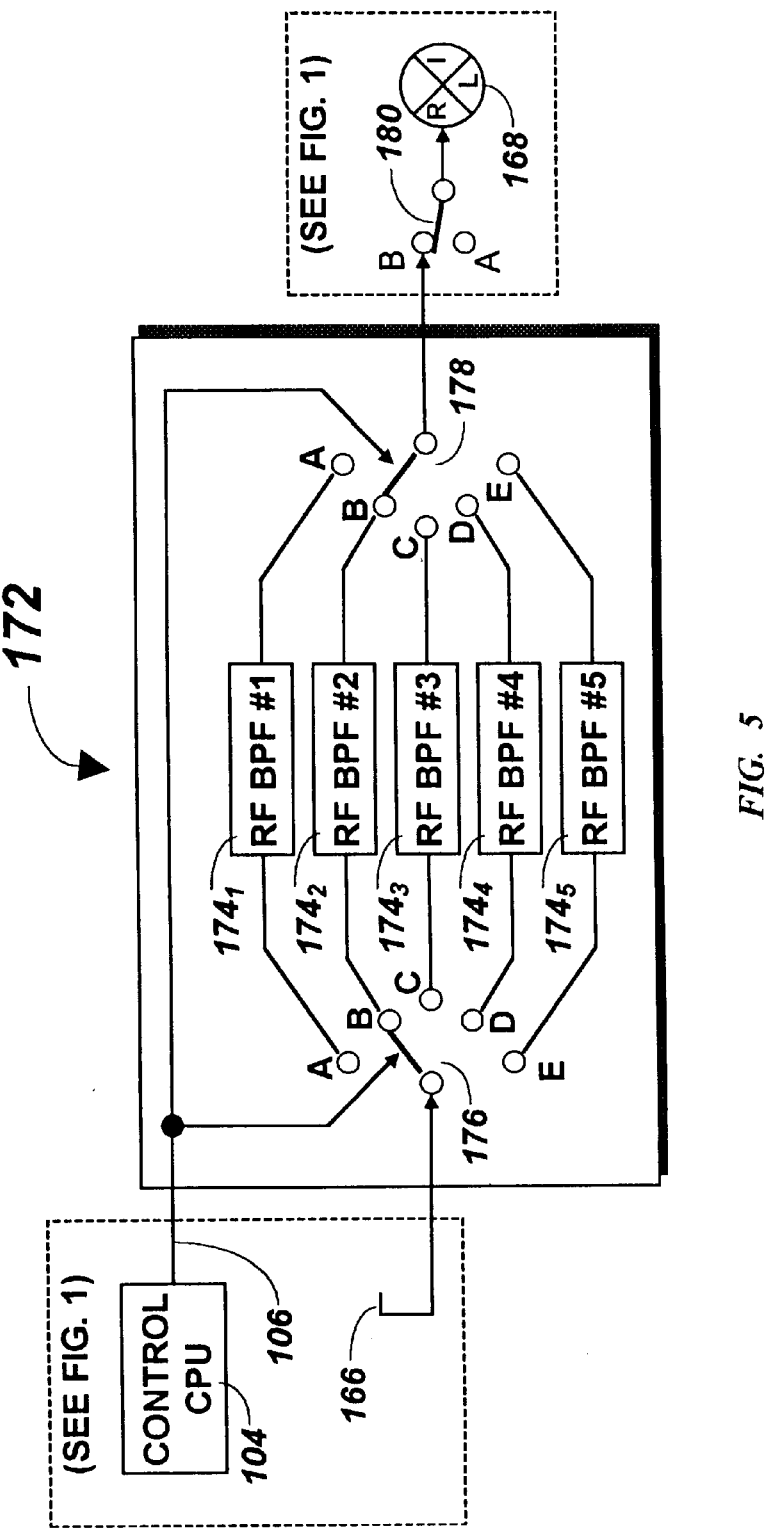
FIG. 5 is a block diagram of the RF band-pass filter bank of FIG. 1.

In the practice of the present invention, $S_{LO}(t)$ frequencies should be carefully chosen to prevent the resulting mixing products from interfering with the components of signal $S_{IF}(t)$ to be analyzed. In the preferred embodiment, it was determined that the frequency of $S_{LO}(t)$ be optimally located 1 MHz below the lowest RF carrier of interest. For example, when analyzing the 54 MHz and 60 MHz carriers contained in $S_{RF}(t)$ as produced by RF generators $126_1$ and $126_2$ for an HRC plan, respectively, the frequency of $S_{LO}(t)$ would be configured to 53 MHz by CPU 104 via control bus 106. The down-conversion process, however, is especially sensitive to second and third-order products created as $S_{LO}(t)$ mixes across the full spectrum of $S_{RF}(t)$. In order to alleviate these sources of interference, it is necessary to precede the down-conversion stage with a switchable RF BPF bank 172 shown in FIG. 5 as preferably comprising RF filters $174_1$, $174_2$, ... $174_5$ with inputs connected to terminals A, B, C, D and E, respectively, of electronic switch 176 and outputs connected to terminals A, B, C D and E, respectively, of electronic switch 178.

As depicted in FIG. 1, the switchable RF BPF bank 172 is interposed between the coupler 166 and the mixer 168 in order to frequency-limit the composite signal 120 before down-conversion is performed. It is desired by the present invention that the frequency pass-bands of adjacent filters included within RF BPF bank 172 overlap sufficiently so as to allow at least one of the RF carriers positioned in the upper pass-band region of a given filter to also pass through the lower pass-band region of the next higher filter in the bank. This guideline is due to the method used by the present invention to measure the relative phase difference between two adjacent RF carriers to be described more fully hereinafter. One way to provide such overlap for the HRC frequencies given by expression (1) is by the selection of pass-band frequencies listed in TABLE 1. (Note: the number of required filters and their pass-band specifications are application specific.)

TABLE 1

| RF FILTER # | PASS-BAND (MHz) |
|---|---|
| $174_1$ | 50 to 78 |
| $174_2$ | 72 to 120 |
| $174_3$ | 108 to 186 |
| $174_4$ | 172 to 300 |
| $174_5$ | 288 to 546 |

Only one of the five RF BPFs $174_1$, $174_2$, ... $174_5$ is selected at any given time by incorporating the switch arrangement illustrated in FIG. 5. The configuration places a single filter in-line with the circuit while disconnecting the remaining four entirely. The control CPU 104 activates the electronic switches 176 and 178 in unison such that each is positioned to the identical throw terminal "A" through "E". The filtered output of the RF BPF bank 172 passes through an electronic switch 180 whose output provides the RF input to the mixer 168.

Figure 6:
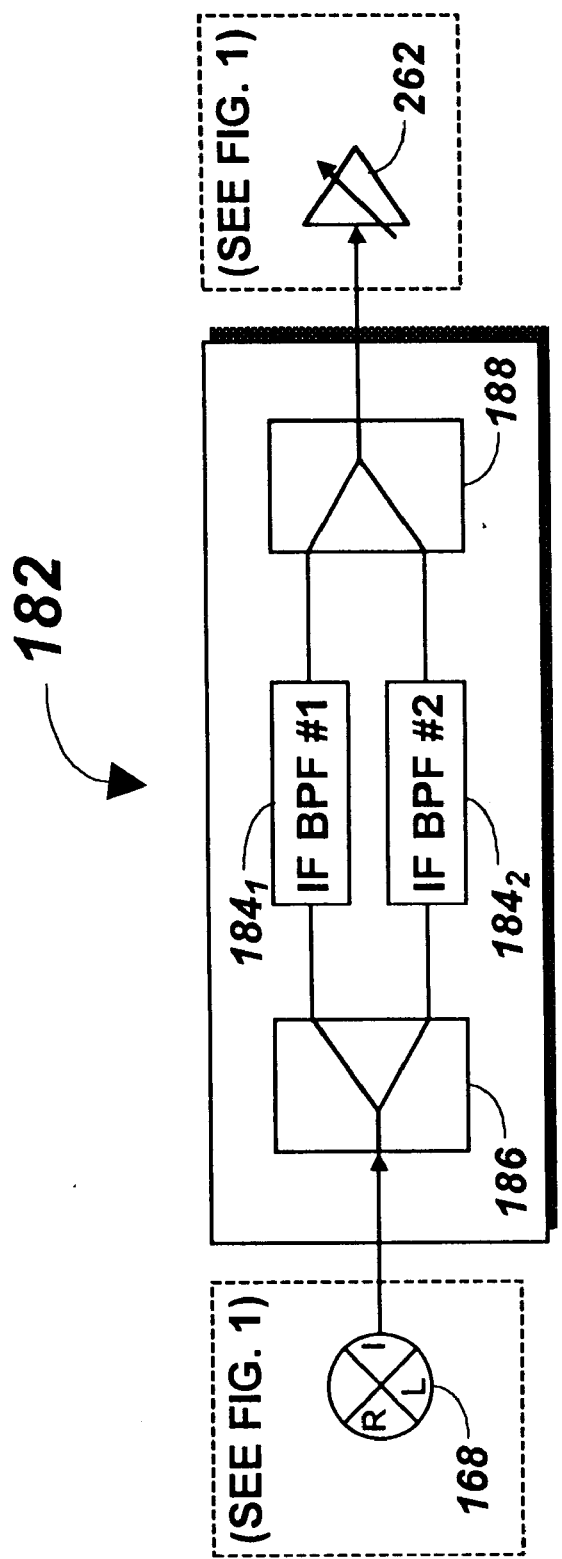
FIG. 6 is a block diagram of the IF band-pass filter bank of FIG. 1.

Signal $S_{IF}(t)$ generated by the mixing process as previously described is itself filtered by a bank of IF band-pass filters 182 comprised of filters $184_1$ and $184_2$, each of which is connected to line splitter 186 at its input and to line splitter 188 at its output as shown in FIG. 6. Unlike the RF BPF bank 172 of FIG. 5, IF filters $184_1$ and $184_2$ operate in parallel. The filtered output of splitter 188 is first amplified 262, then combined with a sychronization signal by summer 190 to be described hereinafter. Both narrow pass-band filters of IF BPF bank 182 have center frequencies as listed in TABLE 2. (Note: the number of required filters and their center-frequency specifications are application specific.)

TABLE 2

| IF FILTER # | CENTER FREQUENCY (MHz) |
|---|---|
| $184_1$ | 1 |
| $184_2$ | 7 |

The specified filters of TABLE 2 remove all but two intermediate frequencies corresponding to adjacent down-converted RF carriers. (Recall that the LO frequency offset from the lowest RF carrier of interest is 1 MHz and that the RF carriers contained in the output of channel modulators $116_1$, $116_2$, ... $116_{83}$ are spaced at 6 MHz in the HRC plan). The purpose of filtering as shown in FIG. 6 is two-fold. First, although $S_{IF}(t)$ (output of mixer 168) represents a down-converted and band-limited subset of $S_{RF}(t)$ (within composite signal 120), it still contains high frequency components which would alias when digitally sampled by the Analog-to-Digital Converter (ADC) 192. This simply means that frequency components higher than half the sampling frequency appear as low frequency artifacts in a Fast Fourier Transform (FFT) spectrum, thereby interfering with genuine low frequency component measurements. The IF BPF bank 182 thus primarily operates as an anti-aliasing filter, but also serves to attenuate unwanted low frequency mixing products as well as video and audio modulation signals. A low-noise amplifier 262 can then be used to increase desired signal levels thereby improving carrier signal sensitivity and Signal-to-Noise Ratio (SNR) in a manner known in the art. The amplifier's 262 gain is controlled by the CPU 104 via control bus 106 so as to maximize filtered IF signal levels without saturating the input to the ADC 192.

As is also known in the art, the required stop-band attenuation of any anti-alias filtering system is dependent, in part, on the bit length of the ADC sampling the filtered signal. As this bit-length increases, so must the filter's attenuation level to completely avoid detection of unwanted signals. It is preferable to have ample attenuation to ensure that aliased signal levels be less than ½ the bit-weight of the ADC's least significant bit. The present invention may use a 12-bit ADC 192, thus requiring 78 dB (from full-scale input level) of stop-band attenuation at potential alias frequencies to satisfy the stated criteria.

The shortfall of the IF BPF bank 182 approach is that it reduces system flexibility. The alternative would be to substitute the IF BPF bank 182 with a single wide-band LPF for elimination of alias frequencies. The unfavorable compromise here is that unwanted in-band components can claim a substantial portion of the ADC's 192 limited input range, thus forcing an amplitude reduction of desired signal components to avoid ADC 192 input saturation.

The ADC 192 samples its input at a rate determined by signal $S_{FS}(t)$ provided by signal generator 194 which is phase-locked to the 1.024 MHz system reference 108 applied thereto via signal path 110. Even so, data sampling can begin at any point relative to the IF signal components to be analyzed. For example, using a sampling frequency ($F_S$) of 32 MHz provided by signal generator 194, there are 32 possible sampling window starting positions relative to IF components at 1 MHz and 7 MHz, resulting in just as many possible measured phase angles. It is therefore necessary to include some form of time synchronization signal, $S_{SYNC}(t)$, such as that provided by signal generator 196, which is also phase-locked to the 1.024 MHz system reference 108 applied thereto via signal path 110.

Signal $S_{SYNC}(t)$ is combined with the output of the IF amplifier 262 by a summer 190. The operation of $S_{SYNC}(t)$ can be further described with reference to FIG. 7 which illustrates $S_{SYNC}(t)$, a CW signal, plotted versus time relative to an arbitrary data sampling interval, or window. A vertical line 198 corresponds to the start of the data sampling window (t=START OF SAMPLING) which is initiated by the assertion of a trigger signal, $S_{TRIG}(t)$, to be described hereinafter. A second vertical line 200 corresponds to the end of said window (t=END OF SAMPLING). The distance between vertical lines 198 and 200 is indicated by a quantity 202 (DATA SAMPLING WINDOW) which is proportional to $F_S$ and the number of recorded data samples. The third vertical line 204 in FIG. 7 corresponds to the first positive peak of $S_{SYNC}(t)$ (REFERENCE t=0) following the start of data sampling with the distance between it and vertical line 198 defined by the time displacement quantity 206 (WINDOW SHIFT, $\Delta t$).

In the operation of the present invention, the synchronization signal, $S_{SYNC}(t)$, is analyzed as a component of the sampled IF signal to determine the amount of time displacement from the start 198 of the data sampling window to the designated time reference 204 on $S_{SYNC}(t)$. Because the frequency of $S_{SYNC}(t)$ is known, its measured phase angle can be transformed into an equivalent time displacement quantity, $\Delta t$ 206, by which other phase measurements corresponding to the carrier IF components located at 1 MHz and 7 MHz are then proportionally "shifted". In doing so, the reference t=0 location 204 serves as a fixed point in time, relative to the composite envelope of signal $S_{RF}(t)$, to facilitate repeatable carrier phase angle computations. By definition, this reference t=0 becomes the point in time at which the desired absolute phase relationships of the carriers will subsequently converge.

When selecting the frequency ($F_{SYNC}$) for synchronization signal $S_{SYNC}(t)$, several factors should be considered, the first of which is that $S_{SYNC}(t)$ does not get down-converted by the mixer 168 as shown in FIG. 1. Therefore, to avoid aliasing, $F_{SYNC}$ should not violate the previously mentioned Nyquist criteria. For a sampling frequency $F_S$ of 32 MHz provided by signal generator 194, $F_{SYNC}$ is theoretically limited to 16 MHz. Secondly, given that $S_{RF}(t)$ (within composite signal 120) is periodic at the fundamental frequency ($F_{FUND}$) from which all carrier components of $S_{RF}(t)$ were derived, it is important that $F_{SYNC}$ be related to $F_{FUND}$ by the following expression:

$$F_{SYNC} = \left(F_{FUND} \times \frac{I}{J}\right) \text{Hertz} \tag{7}$$

where; I and J are integers and I≧J.

The relationship of expression (7) ensures a periodic phase-relationship between signal $S_{SYNC}(t)$ and the composite envelope of $S_{RF}(t)$. $F_{FUND}$ is 6 MHz for the SRC plan making 12 MHz a possible choice for $F_{SYNC}$, in this case corresponding to values of I and J in expression (7) of 2 and 1, respectively. Finally, extraneous $S_{IF}(t)$ signal components including audio carriers and video modulation data not sufficiently removed by the IF BPF bank 182 must not be allowed to corrupt $S_{SYNC}(t)$.

Figure 7:
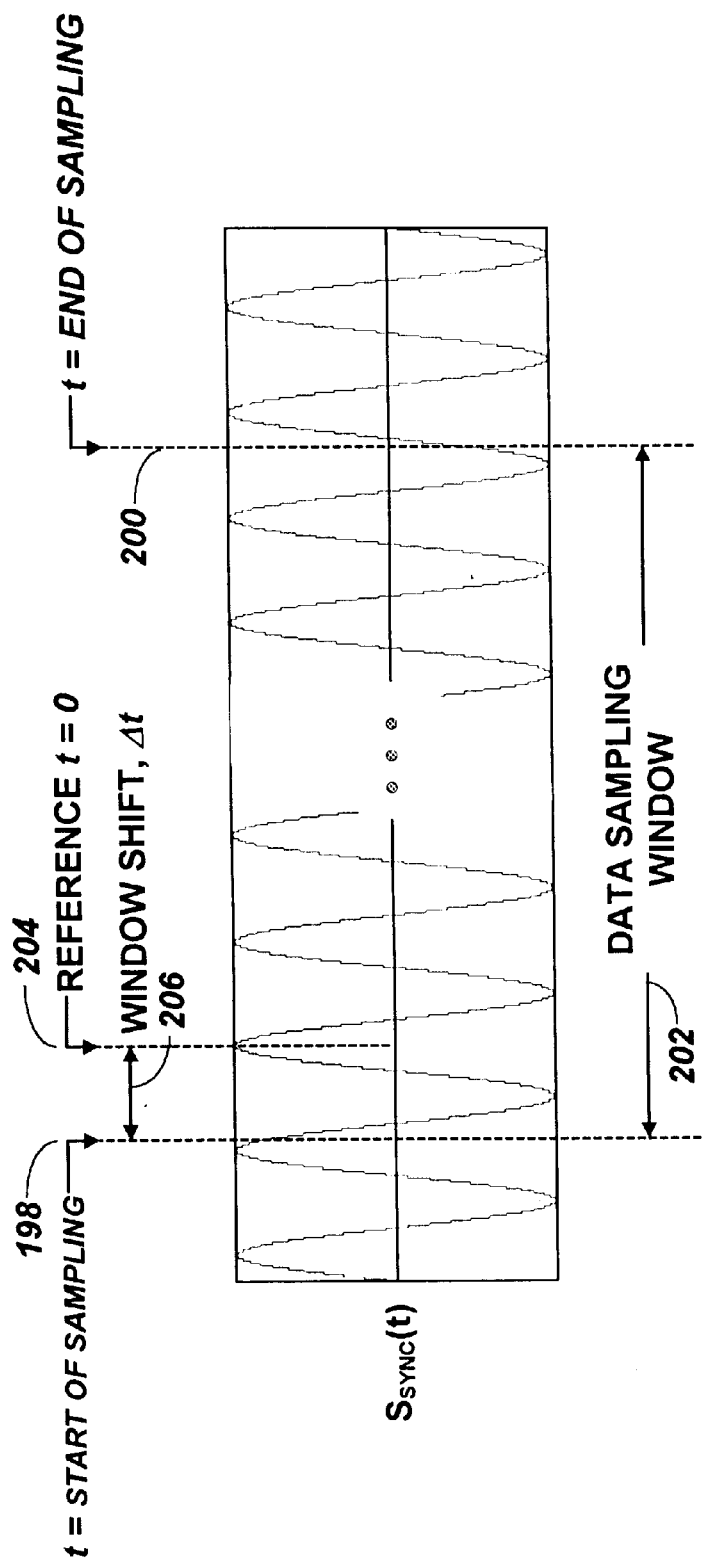
FIG. 7 graphically illustrates the computation of "window shift" as applied to the establishment of a unique time reference for phase angle computations.
Figure 8:
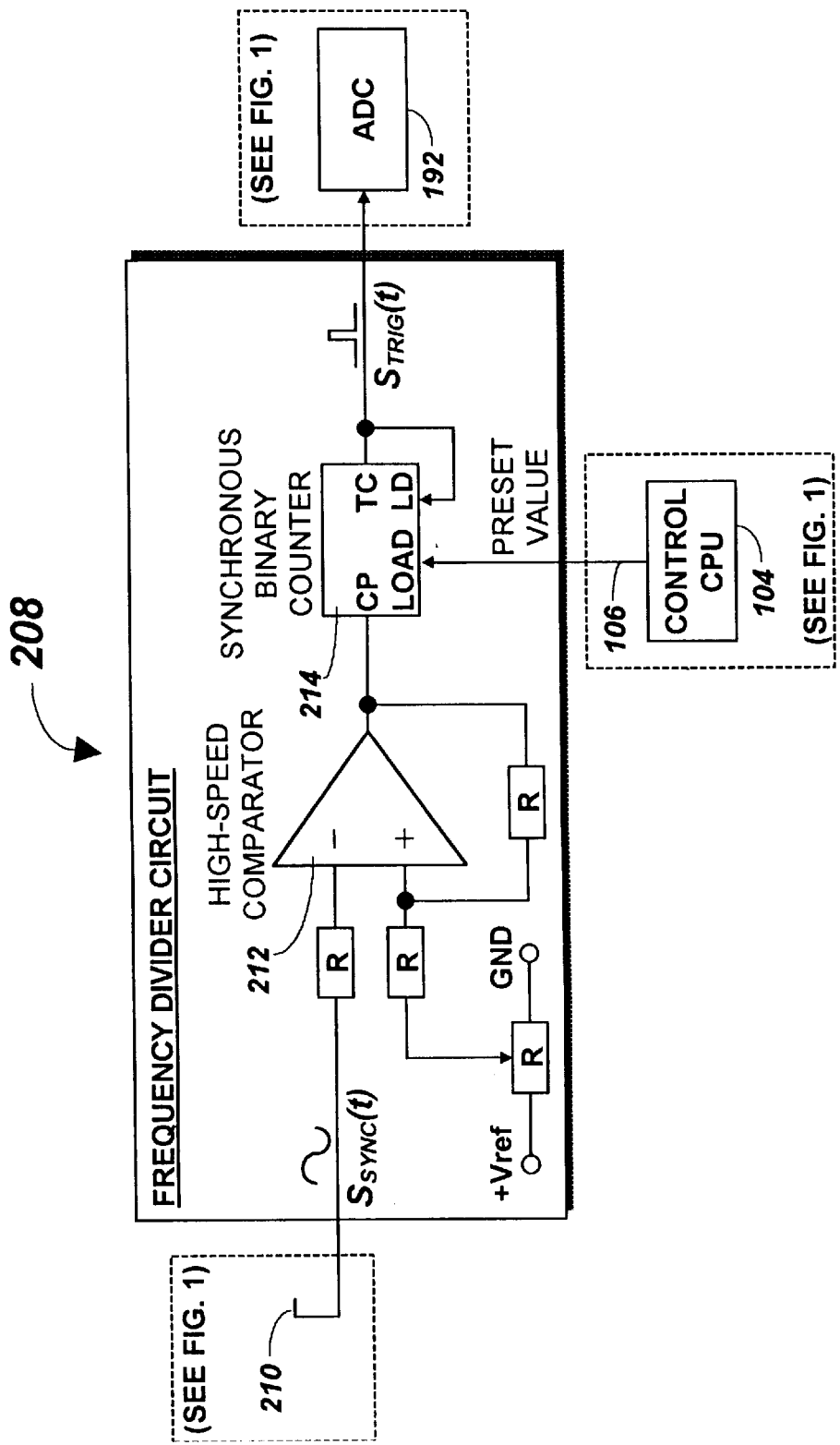
FIG. 8 is a block diagram of the frequency divider circuit of FIG. 1 for generation of an ADC trigger input signal.

As previously indicated, a control signal $S_{TRIG}(t)$ as provided by frequency divider circuit 208 is used to initiate the start of an ADC 192 data sampling window (198 of FIG. 7). $S_{TRIG}(t)$ is derived from passing the tap output of a coupler 210, which splits the synchronization signal $S_{SYNC}(t)$ produced by generator 196, through the frequency divider circuit 208. A preferred embodiment of the circuit 208 is illustrated in FIG. 8 and is comprised of a high-speed comparator 212 and synchronous binary counter 214, both known in the art. The high-speed comparator 212 has resistors connected to its "+" and "−" inputs and its output arranged as shown in FIG. 8 to provide hysteresis. The synchronous binary counter 214 has a load input that receives a preset value from CPU 104 via control bus 106. The effective divide value of the synchronous binary counter 214 would optimally be set to that of I in expression (7) (assuming the integer ratio I÷J has been reduced to its lowest terms). This condition will ensure that the same period of synchronization signal $S_{SYNC}(t)$, relative to the composite envelope of $S_{RF}(t)$, repeatedly occurs at the start of data sampling as defined by the assertion of $S_{TRIG}(t)$. In this manner a unique time reference relative to the combined carrier signal is achieved.

Following the assertion of trigger signal $S_{TRIG}(t)$, the output signal of summer 190 is sampled by the ADC 192 at a rate $F_S$ defined by $S_{FS}(t)$ provided by signal generator 194. Beyond just satisfying the Nyquist criteria previously mentioned, $F_S$ can be chosen to reduce the computational effort of subsequent DSP algorithms to be described hereinafter. Specifically, it is preferable that frequencies of the IF components to be digitally analyzed fall precisely in the middle of an FFT bin to avoid having to linearly shift computed phase angles. FFT bin frequencies are defined by integral multiples of the FFT resolution ($F_{RES}$) expressed as:

$$F_{RES} = \left(\frac{F_S}{N}\right) \text{Hertz} \tag{8}$$

where; N represents the FFT size (typically 2 raised to a power).

Letting $F_S$=32 MHz and N=8192 (i.e. $2^{13}$), $F_{RES}$ computes to 3.90625 kilohertz (kHz) which divides evenly into IF component frequencies at 1 MHz, 7 MHz, and 12 MHz thereby satisfying the objective. This FFT frequency resolution is also sufficient to isolate carrier energy from related video sync signals (positioned approximately 15.75 kHz away from carrier) which undoubtedly will not be filly attenuated by the IF BPF bank 182.

The invention further includes the operation of a pair of CW signals produced by generators 216 and 218 which serve as calibration signals used to establish an absolute phase reference of the carrier supplied by RF generator 126$_1$. Returning to the equation of expression (6b), the three unknowns which contribute to a measured IF component's phase angle are the respective RF carrier's phase constant, ($\theta_i$), the phase constant of the LO signal used during down-conversion, ($\theta_{LO}$), and time, (t). For the moment, let's assume that measured IF phase angles are "shifted" to the time reference point defined by $S_{SYNC}(t)$ and $S_{TRIG}(t)$ as shown in FIG. 7, such that t=0. Then, to resolve the absolute phase of the 54 MHz carrier produced by RF generator 126$_1$ for the HRC plan, only the phase constant of the LO signal used to down-convert the respective carrier must be known at the said time reference t=0. For this purpose, signal generator 216 provides an RF calibration signal $S_{CAL/RF}(t)$, while the second generator 218 produces an LO calibration signal $S_{CAL/LO}(t)$.

Figure 9:
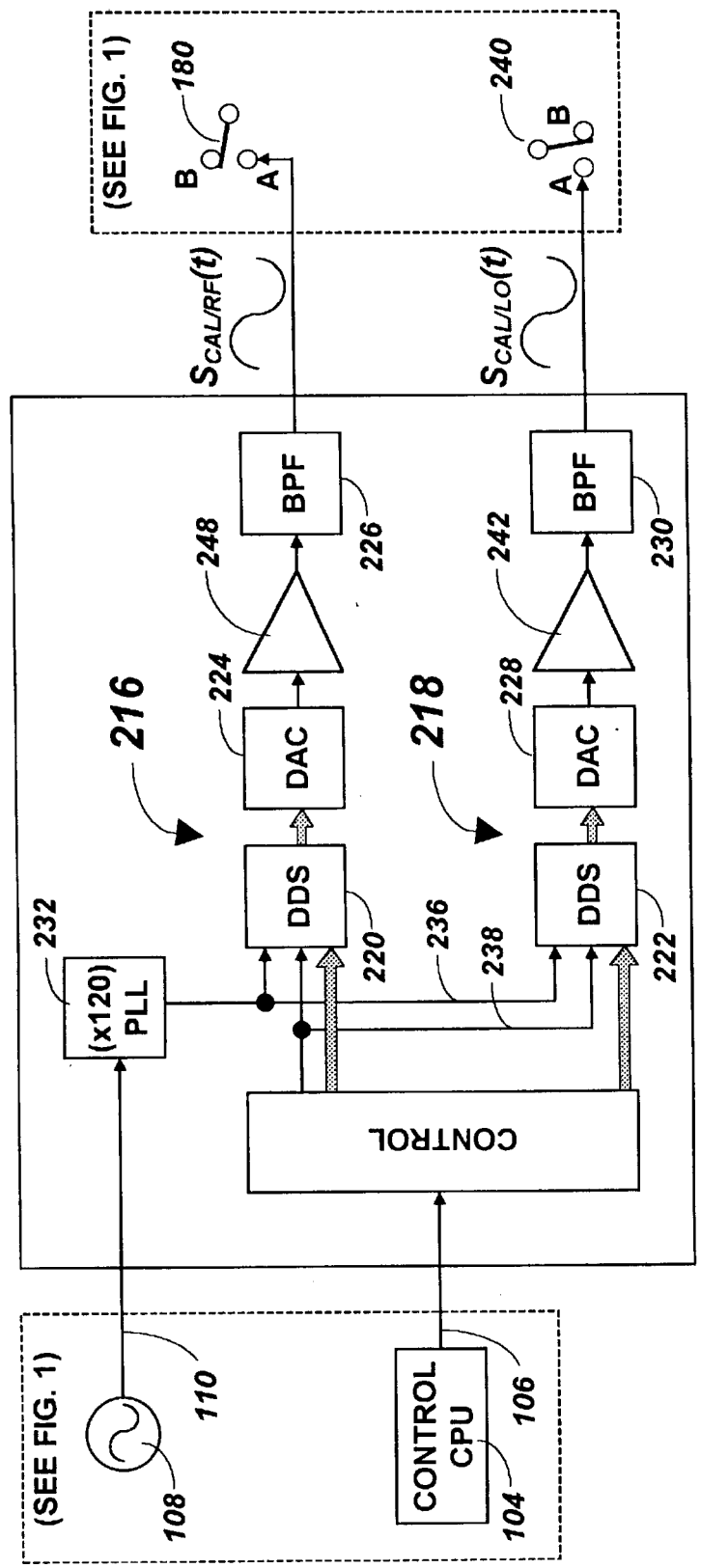
FIG. 9 is a block diagram of the pair of RF calibration signal generators of FIG. 1.

Calibration signal generators 216 and 218 are both constructed using DDS technology similar to that implemented within RF generator 126 as previously described. The principal difference, as can be seen by comparing FIG. 3 with FIG. 9, is that the RF PLL stage 160 has been removed from the calibration signal generator design to eliminate the unknown phase offset that would otherwise be introduced each time the RF PLL stage is powered. The result is the establishment of a repeatable and absolute relationship between the phase constants of the calibration signal pair, a benefit to be further described hereinafter.

Without an RF PLL stage, the maximum signal frequency attainable from generators 216 and 218 is limited by the clocking rate of their DDS devices. Recent advances in DDS technology have yielded components which can support clocking rates up to 130 MHz, as with a DDS device made available from Qualcomm identified as Q2368, making it theoretically capable to directly synthesize signal frequencies approaching 65 MHz. With reference to FIG. 9, generators 216 and 218 incorporate such high-speed DDS devices, 220 and 222, respectively.

DDS devices 220 and 222 are configured to receive a common 122.88 MHz clock via signal path 236 produced by multiplying the 1.024 MHz system reference 108 by a (×120) PLL stage 232, thereby phase-locking signals $S_{CAL/RF}(t)$ and $S_{CAL/LO}(t)$ with all other system-generated sources. With their frequencies programmed and the phase accumulators of both DDS devices cleared by the CPU 104 via control bus 106, a second control line 238 is used to "start" both devices at precisely the same time. This technique can repeatedly produce a known absolute phase relationship between the two synthesized calibration signals, referenced to this start time. As with the DDS-based RF generators 126, the digitized output signals are converted to analog form via the corresponding DAC (224 and 228) followed by related amplification (248 and 242) and BPF stages (226 and 230). Any phase offset induced by analog conditioning and/or signal paths leading up to the mixer 168 can be compensated for by assigning a measured calibration constant to the matched signal pair.

OPERATION OF THE METHOD AND APPARATUS OF THE INVENTION

Figure 11:
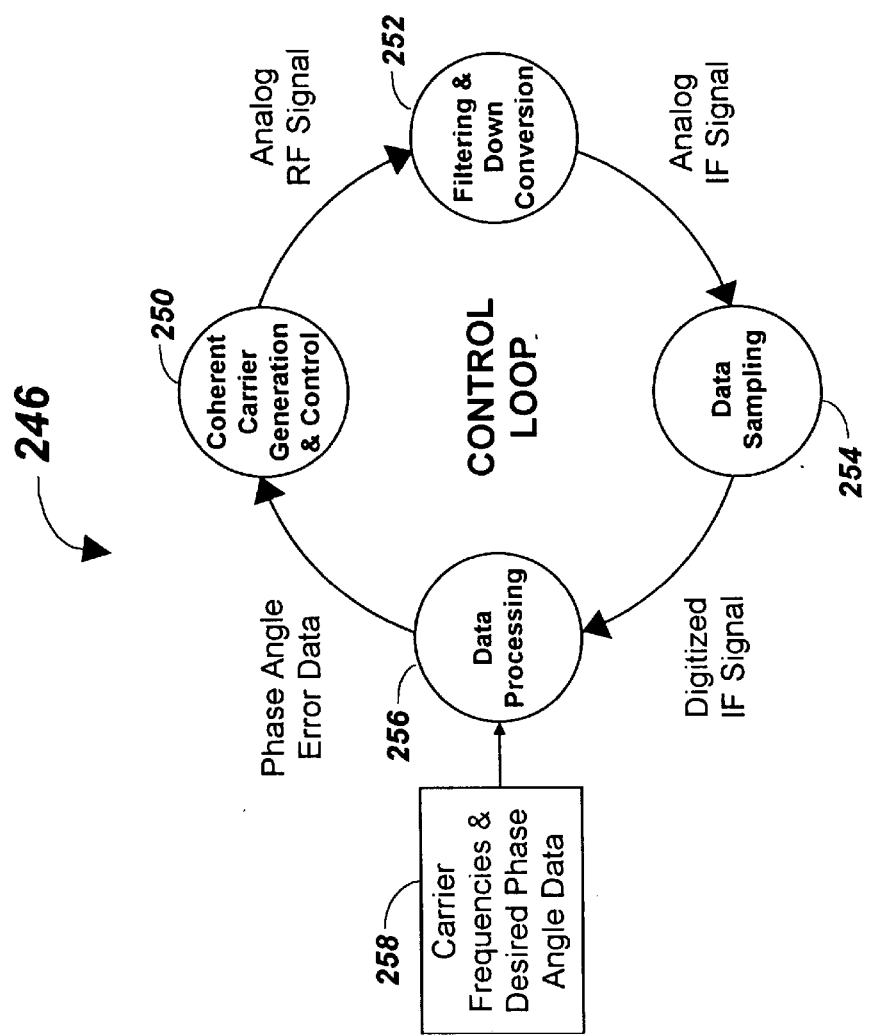
FIG. 11 graphically illustrates the closed-loop data/process flow diagram of the present invention in which the peak factor of a coherent FDM system converges toward a desired condition.

The overall operation of system 100 is graphically represented in FIG. 11 which illustrates a closed-loop data/process flow diagram 246 whose error signal approaches zero as actual phase angles of the RF carriers converge toward predetermined values. The flow diagram 246 is comprised of segments 250, 252, 254, and 256, wherein segment 256 receives user inputs shown as segment 258 consisting of carrier frequency values (e.g. HRC plan frequencies in preferred embodiment), to be produced by RF generators 126$_1$, 126$_2$, ... 126$_{63}$, along with desired phase angles for each respective RF carrier signal such that the desired peak factor may be achieved. With reference to FIC. 1, user-inputs are received by the CPU 104 via signal path 260 meant to signify a keyboard, graphical-user interface, or other method of data entry.

The desired phase angles are of particular importance to the present invention since once the RF carrier signals acquire these predetermined values, the resultant peak factor of the combined carrier envelope within composite signal 120 will have also attained its desired state. For the preferred embodiment, phase angles are chosen for each carrier signal such that the interference pattern (i.e. constructive and/or destructive combining), formed as the vector sum of all carriers, produces a minimum contribution to the overall peak factor of the composite signal 120.

Segment 250 of FIG. 11 represents the system's ability to both generate and control a number of coherent carrier signals. Following system power-up, and with reference to FIG. 1, the operating programs of the control CPU 104 begin to initialize the frequencies of the DDS-based RF generators 126$_1$, 126$_2$, ... 126$_{83}$ via control bus 106 according to the HRC frequency plan as defined in expression (1). Because the generators 126$_1$, 126$_2$, ... 126$_{83}$ are phase-locked to a common system reference 108, the resulting RF carriers are, by definition, coherent. In like manner, the coherent 10 MHz reference signal generator 112 is also initialized along with calibration signal generators 216 and 218. The modulated carriers are subsequently combined by the summer 118 forming a composite signal 120.

Segment 252 of FIG. 11 denotes the down-conversion process performed on the combined modulated RF carriers through use of a mixer 168 and LO signal. This process causes the phase angles of the resulting IF carrier components to represent those of the related RF carriers, offset by an amount equal to the phase angle of the respective LO signal as previously shown in expression (6b). Therefore, in order to resolve the true, or absolute, phase angle of the lowest frequency RF carrier, the phase of the LO signal used in the down-conversion process must first be known. (Note: the term absolute phase angle refers to a carrier's phase constant as defined in expression (4) relative to time reference t=0 (204) of FIG. 7).

For this purpose, calibration signals produced by generators 216 and 218 are put to use. If the absolute phase constants of a calibrated signal pair $S_{CAL/RF}(t)$ and $S_{CAL/LO}(t)$ are known for any time (t), the control CPU 104 is able to resolve their absolute phase relationship referenced to t=0 (204) as previously defined in FIG. 7. To accomplish this, electronic switches 180 and 240 (see FIG. 1) are first placed in position "A" by way of CPU 104 via control bus 106, causing the mixer 168 to receive both the calibration RF signal $S_{CAL/RF}(t)$ ($F_{CAL/RF}$=39 MHz) from generator 216 and the calibration LO signal $S_{CAL/LO}(t)$ ($F_{CAL/LO}$=47 MHz) from generator 218. Next, also by CPU 104, both DDS-based generators 216 and 218 are "started" at precisely the same time forcing both calibration signal phase constants, $\theta_{CAL/RF}(t)$ and $\theta_{CAL/LO}$, to equal 270 degrees (Note: assumes cosine functions synthesized from sine wave look-up tables starting at 0 degrees). The resultant 7 MHz IF signal $S_{CAL/IF}(t)$ is first band-pass filtered by IF BPF bank 182, then amplified by a low-noise IF amplifier 262, and finally combined by a summer 190 with the synchronization signal produced by generator 196.

Segment 254 of FIG. 11 represents the process by which the ADC 192 captures 8192 samples of 12-bit amplitude data following the assertion of a trigger signal provided by the frequency divider circuit 208. Data is effectively sampled at 32 MHz as defined by the sampling clock signal produced by generator 194. Sampled data are stored directly into Random-Access Memory (RAM) (not shown on FIG. 1) such that data can be moved between the ADC 192, DSP 244, and CPU 104 as required via a shared data bus known in the art (also not shown on FIG. 1).

Finally, segment 256 symbolizes the block of sampled data being transferred to the DSP 244 which executes a Hanning window function followed by a complex FFT algorithm, known in the art, to yield pairs of real and imaginary numbers (Re+Im) for each of 4096 FFT frequency bins. From this data, the raw magnitude ($H_{(bin)}$) and phase angle ($\theta_{(bin)}$), respectively, can be computed for both the IF calibration and synchronization signals using the following expressions:

$$H_{(bin)} = \sqrt{Re^2_{(bin)} + Im^2_{(bin)}} \quad (9)$$

$$\theta_{(bin)} = \arctan\left(\frac{Im_{(bin)}}{Re_{(bin)}}\right) \text{ degrees} \quad (10)$$

where; (bin) represents a complex FFT pair subscript ranging from 1 to 4096.

A particular signal's FFT bin number is most often computed by dividing its frequency by the FFT resolution as defined by expression (8), then adding one; however, the bin number may differ depending on the FFT algorithm used. Recall that the FFT resolution specified in the preferred embodiment was chosen such that it divides evenly into signal frequencies of interest, thus forcing the frequency values to fall precisely in the center of a bin's range. This is the desirable condition when using phase angles computed from expression (10). Also with reference to expression (10), it is important that the arctan function take into account the sign of both the real and imaginary components (Re+Im) such that full-quadrature angles can be resolved within the range of $-\pi$ to $+\pi$ for all FFT bins. Signal magnitudes, $H_{(bin)}$, computed by expression (9) are used primarily to confirm a minimum signal strength since "valid-looking" phase angles, $\theta_{(bin)}$, given by expression (10) are possible even if the related signal is not present.

The measured phase angle of the 12 MHz synchronization signal, $\theta_{SYNC}$, is used to proportionally "shift" the measured phase angle of the 7 MHz IF calibration signal, $\theta_{CAL/IF(MEAS)}$, in the manner illustrated in FIG. 7 thereby computing $\theta_{CAL/IF}$, a phase angle which is now time-referenced to the defined t=0 (204) This process can be shown mathematically as:

$$\theta_{CAL/IF} = \left[\theta_{CAL/IF(MEAS)} - \left(\theta_{SYNC} \times \frac{F_{CAL/IF}}{F_{SYNC}}\right)\right] \quad (11)$$

$$= \left[\theta_{CAL/IF(MEAS)} - \left(\theta_{SYNC} \times \frac{7 \times 10^6}{12 \times 10^6}\right)\right] \text{ degrees}$$

Referencing the lower sideband term of expression (6b), $\theta_{CAL/IF}$ is related to the calibration signal phase constants as shown in the expression below:

$$\theta_{CAL/IF} = [(\omega_{CAL/LO} - \omega_{CAL/RF})t_{CAL} + \theta_{CAL/LO} - \theta_{CAL/RF}] \text{ degrees} \quad (12)$$

The unknown variable, $t_{CAL}$, of expression (12) represents the time displacement from the start of the calibration signals, as defined by known calibration phase constants $\theta_{CAL/RF}$ and $\theta_{CAL/LO}$, relative to the time reference t=0 (204). Substituting known constants and solving for $t_{CAL}$ yields the following expression:

$$t_{CAL} = \left[\frac{\theta_{CAL/IF}}{360 \times (7 \times 10^6)}\right] \text{ seconds} \quad (13)$$

The desired absolute phase constant $\theta_{LO}$ of the LO signal at the time reference t=0 can then be computed as:

$$\theta_{LO} = [(360 \times t_{CAL} \times F_{LO}) + \theta_{CAL/LO}] \quad (14)$$

$$= \left[\left(\theta_{CAL/IF} \times \frac{47}{7}\right) + 270\right] \text{ degrees}$$

With $\theta_{LO}$ known, the control CPU 104, via appropriate signals of control bus 106, places electronic switch 180 to position "B" so that the 54 MHz carrier signal produced by the first RF generator 126₁ for the HRC frequency plan can be analyzed. However, the second electronic switch 240 is kept at position "A" so that the computed calibration LO phase of expression (14) can be used to resolve the absolute phase constant of the 54 MHz carrier, $\theta_{54}$. Referencing FIG. 5, the CPU 104 selects the filter having the lowest frequency pass-band, (i.e. RF BPF 174₁), by placing electronic switches 176 and 178 to position "A".

Similar to the analysis of the IF calibration signal, the phase angle of the resultant 7 MHz IF signal is measured and shifted to the time reference t=0 (204), thus producing $\theta_7$ which is related to the respective RF carrier's absolute phase constant by the expression given below:

$$\theta_{54} = (\theta_7 + \theta_{LO}) \text{ degrees} \quad (15)$$

The CPU 104 then applies a phase-error adjustment equal to the negative of $\theta_{54}$ to RF generator 126₁ via control bus 106 to yield a 54 MHz reference carrier whose absolute phase constant is zero degrees at the reference t=0 (204). Electronic switch 240 is next moved to position "B" thereby connecting the output of variable LO generator 170 to the mixer 168 for all subsequent measurements. At this point, the control loop process 246 is repeated so as to measure the relative phase differences between each consecutive pair of adjacent carriers produced by RF generators 126₁, 126₂, ... 126₈₃ which are included in composite signal 120.

Relative phase measurements are made beginning with the carrier closest the reference carrier component having already been adjusted for zero absolute phase at the time reference t=0 (204 of FIG. 7). The reference carrier (e.g. 54 MHz, or 9th harmonic, in the HRC plan) serves as an absolute phase reference for which all further relative phase computations are performed. A relative phase computation begins with careful selection of the LO frequency (e.g. 53

MHz for the first carrier pair) followed by a phase-angle measurement of IF components at 1 MHz and 7 MHz, as well as that of the synchronization signal, $\theta_{SYNC}$. In the manner as presented earlier, $\theta_{SYNC}$ is used to proportionally shift those of the carrier components to the time reference t=0, which in the case of the first carrier pair, produces repeatable values for the following expressions:

$$\theta_1 = (\theta_{54} - \theta_{LO}) \text{ degrees} \tag{16a}$$

$$\theta_7 = (\theta_{60} - \theta_{LO}) \text{ degrees} \tag{16b}$$

where; $\theta_{LO}$ represents a now random and unknown phase angle of the LO signal common to both IF components. The unknown LO phase is subsequently removed by straight subtraction of the phase angles given by expression (16) to furnish a computed relative phase difference, $\theta\text{REL\_COMPUTED}_i$ (for harmonic subscript i=10), between the two IF components as shown in the following expression. Note that relative phase differences of measured IF components equal those of their RF counterparts.

$$\begin{aligned}\theta_{REL\_COMPUTED_{10}} &= (\theta_7 - \theta_1) \\ &= [(\theta_{60} - \theta_{LO}) - (\theta_{54} - \theta_{LO})] \\ &= (\theta_{60} - \theta_{54}) \text{ degrees}\end{aligned} \tag{17}$$

There are inherent sources of system error which can impact expected results. For example, some components of system 100 presented in FIG. 1 may alter a signal's velocity of propagation, that is, the rate at which the signal travels through the system. If changes to signal velocity are a non-linear function of frequency, a non-linear phase dispersion occurs within the measured phase angles of the RF carriers. For this purpose, a phase calibration data table is provided to the control program containing phase offset values to counteract any non-linear delay induced by system 100 components, in particular the RF BPF bank 172. Essentially, the system's phase response from the coupler's 166 output through to the mixer's 168 input is characterized as known in the art, using a network analyzer, for each adjacent pair of RF signals thereby producing a table of net relative phase delays. Corresponding values are subtracted (not shown) from relative phase difference computations such as that given by expression (17). Furthermore, as with any measured parameter, a certain percentage of error is inevitable. Based on observed carrier phase measurements, error can be characterized by a random distribution resulting in a zero-mean accumulation when computing relative phase differences across the entire CATV spectrum.

Following the completion of each relative phase difference computation, the LO generator 170 is advanced by an amount equal to the frequency spacing of two adjacent carriers, (e.g. 6 MHz for the HRC plan), thereby causing all but the first and last of said RF carriers to be involved in two consecutive relative phase computations. The control CPU 104 should sequence the position of the RF BPF bank's 172 electronic switches 176 and 178 from "A" to "E" as the RF frequencies to be measured progress through each respective filter's pass-band.

Computed relative phase differences between all adjacent carriers, derived similarly to that shown in expression (17) for the first pair, are then compared with optimal relative phase differences, $\theta\text{REL\_OPTIMAL}_i$, as determined from user-supplied phase angles. The result is an array of phase error values as shown in expression (18). The CPU 104 then uses this phase error array to phase-adjust the related DDS-based carrier generators.

$$\theta\varepsilon_i = [(\theta_{REL\_COMPUTED_i} - \theta_{REL\_OPTIMAL_i}) + \theta\varepsilon_{i-1}] \text{ degrees} \tag{18}$$

where; Harmonic subscript i=10 to 91 (for the HRC plan of expression (1)) and $\theta\varepsilon_9 = 0$ (by definition as absolute reference).

As previously discussed with reference to FIG. 11, the array of phase error values computed by the CPU 104 using expression (18) will converge toward zero, with each update iteration, as actual carrier phase angles approach optimal values.

Optimal phase angles provided by the user can be derived in one of several ways; by empirical tests, numerical simulations, or mathematical computations. For optimal phases other than all zero degrees, the preferred method is to begin with a set of phase angles as provided by the Newman algorithm described by Stephen Boyd, in the technical article "Multitone Signals with Low Crest Factor," published in the *IEEE Transactions on Circuits and Systems*, Vol. CAS-33, No. 10, October 1986, pp. 1018–1022. The Newman algorithm can be expressed as shown below:

$$\theta_i = \left[\frac{\pi(i-1)^{\exp}}{N}\right] \text{ radians} \tag{19}$$

where; i=Harmonic # (e.g. 9 to 91 for HRC plan of expression (1)), N=# of Carriers (e.g. 83 for illustrated preferred embodiment), and "exp" ranges from 0 to 2 for a near-maximum to minimum peak factor condition, respectively.

It is important to note that the Newman algorithm of expression (19) assumes that all carrier components possess equal amplitudes.

It has been observed that the method and apparatus of the present invention are moderately tolerant of common error sources, however, overall system performance can be improved by close attention to particular specifications. For example, carrier phase noise should be minimized to reduce phase measurement fluctuations. In most cases, this random error component can be overcome through measurement averaging. It is important to choose an ADC 192 which offers good linearity and dynamic range. Furthermore, ADC loading should be regulated via variable amplification 262 and/or attenuation stages (not shown on FIG. 1) to maximize desired signal levels without clipping the input signal.

Finally, while the above detailed description has revealed and illustrated the fundamental novel features of the invention as applied to a preferred embodiment, it will be understood that various omissions, substitutions, or modifications to the form and details of the method and apparatus may be made by those skilled in the art, without departing from the spirit of the invention. For example, some industry modulators are designed to be "frequency agile", that is, they posses the ability to internally generate any required CATV carrier signal given an external reference having a predetermined frequency such as 6 MHz. In this situation, the RF generators $126_1, 126_2, \ldots 126_{83}$ would provide individual external reference signals to each respective modulator $116_1, 116_2, \ldots 116_{83}$, instead of the actual carrier signals. Required phase adjustments for each modulator-generated carrier are achieved by applying the computed phase error to the related external reference signal. Of course, any applied phase error must be scaled by the ratio of the reference-to-carrier signal frequencies.

As a second example, it is common for CATV headends to use off-air channels (i.e. those received via antenna) to establish a frequency reference for phase-locking particular modulators in cases where local VHF-band channels fall on or near the frequency of a CATV channel. This condition typically exists for up to six channels in the lower frequency range, thus producing some carriers which are not coherent. The phase angles of these non-coherent carriers can not be measured and controlled in the manner described by the present invention. Additionally, it is not uncommon that one or more CATV channels for a given headend remain unused, especially within the FM radio band. In either case, the desired solution may be to provide a coherent CW signal source to substitute for the non-coherent and/or missing carrier(s) in order to facilitate relative phase measurements as previously described herein.

Figure 10:
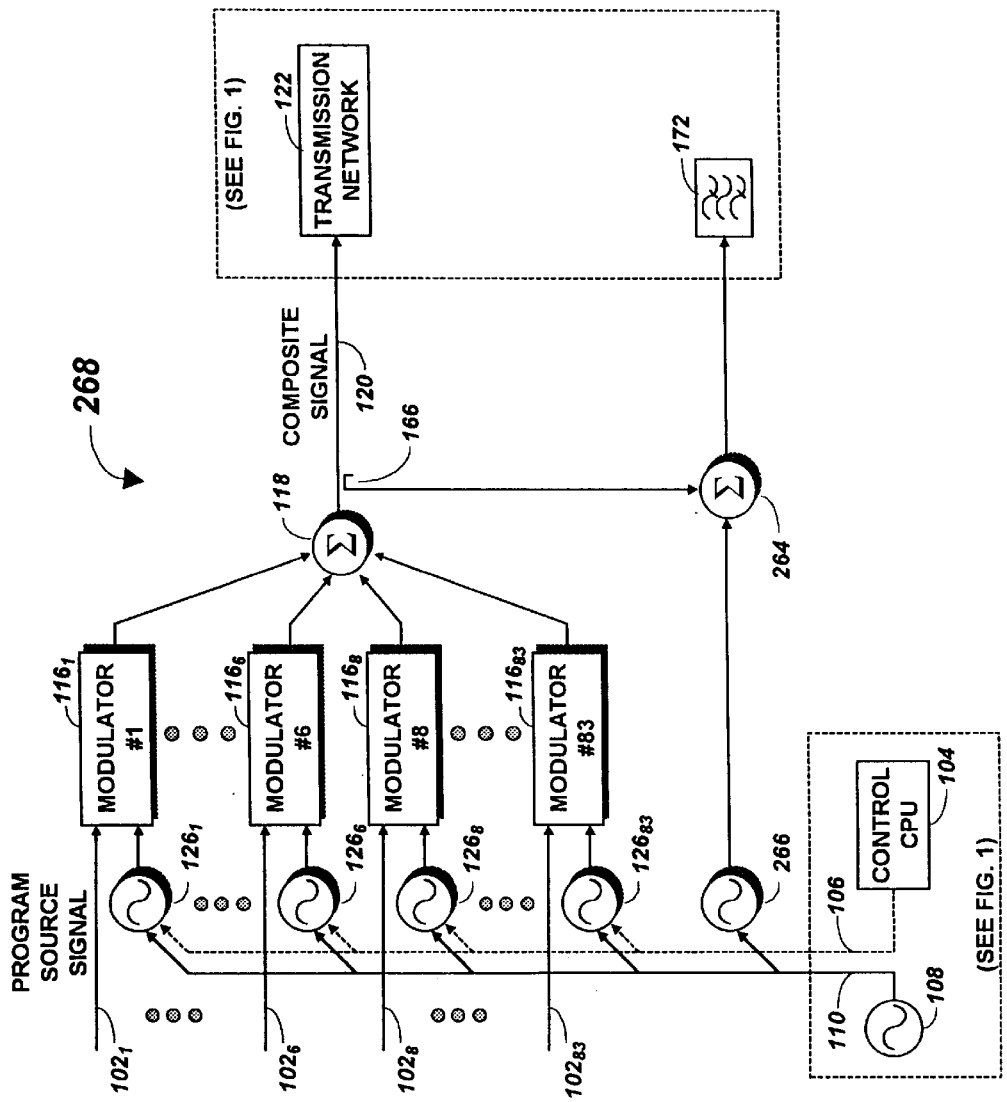
FIG. 10 is a modified system block diagram illustrating an unused CATV channel condition.

With reference to FIG. 10, the scenario of a missing modulated CATV carrier is illustrated. In particular, modulator #7 ($116_7$), which would normally supply a 90 MHz video carrier in an HRC plan, is shown unused resulting in a larger frequency spacing between adjacent carriers produced by modulator #6 ($116_6$) and modulator #8 ($116_8$). By adding a third filter to the IF BPF bank 182 and in some cases making minor modifications to the RF BPF bank 172 pass-band specifications, it would be possible for the described methods to accommodate this condition in a straight-forward manner. However, if the carrier spacing becomes too large such that a frequency of an IF component to be analyzed violates the Nyquist criteria, a substitute coherent carrier 266 can be used to "fill" the larger frequency gap created by the missing modulator. Note that the substitute carrier must be coherent with the system reference 108 but does not require phase-adjustability, therefore, a simple PLL circuit would suffice. Also note that a substitute carrier is not necessarily combined into the headend composite signal 120 via summer 118, but instead can feed a second summer 264 along with the modulated carriers supplied via the coupler 166 in order to provide a signal for phase-angle analysis as previously described. While this configuration may allow for a small increase in the power per channel of the transmitted composite signal, it also permits a non-coherent local channel (not shown in FIG. 10) to occupy the substitute carrier's frequency range.

What we claim is:

1. A method for controlling the peak factor of a coherent Frequency-Division-Multiplexed (FDM) system comprising the steps of:
   (a) providing means for generating a plurality of coherent carriers each having a phase angle which can be controlled in response to a corresponding phase angle error signal;
   (b) establishing the frequencies of said coherent carriers such that each is an integral multiple of a predetermined fundamental frequency;
   (c) combining said coherent carriers into a composite signal;
   (d) digitally sampling said composite signal at a predetermined sampling rate, made coherent with said coherent carriers, so as to derive sampled composite data;
   (e) digitally processing said sampled composite data to resolve the phase angle of each of said coherent carriers;
   (f) comparing each of said resolved phase angles of said coherent carriers against a respective predetermined desired phase angle with the individual differences producing an array of corresponding phase angle error signals;
   (g) applying the said array of corresponding phase angle error signals to adjust said phase angles of said coherent carriers; and
   (h) repeating steps (d) through (g) such that each of said corresponding phase angle error signals converges toward zero as said resolved phase angles of said coherent carriers converge toward said respective predetermined desired phase angles.

2. The method according to claim 1, wherein said predetermined phase angles are selected to provide a predetermined peak factor for said FDM system.

3. The method according to claim 1, further comprising the following step interposed between steps (c) and (d) of claim 1:
   (a) down-converting said composite signal using a predetermined and adjustable Local Oscillator (LO) signal, made coherent with said coherent carriers, so as to shift said composite signal's spectrum to lower frequencies, thereby producing a composite Intermediate Frequency (IF) signal.

4. The method according to claim 1, further comprising the following step interposed between steps (c) and (d) of claim 1:
   (a) combining said composite IF signal with a synchronization signal whose predetermined frequency is coherent with those of said coherent carriers.

5. The method according to claim 4, further comprising the following step interposed between steps (d) and (e) of claim 1:
   (a) processing said sampled data to resolve the phase angle of said synchronization signal in order to establish a fixed time reference point.

6. The method according to claim 1, wherein said resolved phase angles represent the relative phase differences between two carrier components of said composite signal.

7. The method according to claim 3, further comprising the following steps interposed before step (a) of claim 1:
   (a) generating a pair of CW calibration signals, one serving as a calibration input signal and the other a calibration LO signal, each having a predetermined frequency made coherent with said carriers, and whose absolute phase relationship with respect to each other is also predetermined;
   (b) configuring signal connections in a manner such that the said down-conversion process is performed exclusively using said calibration signals, thereby producing a calibration IF signal;
   (c) combining said calibration IF signal with a synchronization signal made coherent with said calibration IF signal;
   (d) digitally sampling said combined calibration IF signal and said synchronization signal at a predetermined sampling rate, made coherent with said calibration IF signal, so as to derive sampled calibration IF data;
   (e) digitally processing said sampled calibration IF data to resolve the absolute phase angle of said calibration LO signal;
   (f) configuring signal connections in a manner such that the said down-conversion process is performed on said composite signal using said calibration LO signal having a known absolute phase angle, thereby producing a composite IF signal;
   (g) combining said composite IF signal with said synchronization signal made coherent with said composite IF signal;

(h) digitally sampling said combined composite IF signal and said synchronization signal at a predetermined sampling rate, made coherent with said composite IF signal, so as to derive sampled composite IF data;

(i) digitally processing said sampled composite IF data to resolve the absolute phase angle of at least one carrier component included in said composite IF signal; and (j) applying the said resolved absolute phase angle error signal to adjust the phase angle of said at least one carrier component so as to establish said at least one carrier component as an absolute signal to which subsequent relative phase angle measurements can be referenced, thereby effectively resolving the absolute phase angles of all carrier components included in said composite signal.

8. The method according to claim 1, further comprising steps of:

(a) initiating said digital sampling of said composite signal by the assertion of a trigger signal whose frequency is coherent with those of said coherent carriers; and (b) providing means for generating said trigger signal whose frequency equals an integral sub-harmonic of said predetermined fundamental frequency.

9. An apparatus for controlling the peak factor of a coherent FDM system comprising:

(a) means for generating a plurality of coherent carriers and for controlling each of said coherent carrier's phase angles in response to corresponding phase angle error signals;

(b) means for establishing the frequencies of said coherent carriers such that each is an integral multiple of a predetermined fundamental frequency;

(c) means for combining said coherent carriers into a composite signal;

(d) means for digitally sampling said composite signal at a predetermined sampling rate, made coherent with said coherent carriers, so as to derive sampled composite data;

(e) means for digitally processing said sampled composite data to resolve the phase angle of each of said coherent carriers;

(f) means for comparing each of said resolved phase angles of said coherent carriers against a respective predetermined desired phase angle with the individual differences producing an array of corresponding phase angle error signals; and (g) means for applying the said array of corresponding phase angle error signals to adjust said phase angles of said coherent carriers.

10. The apparatus according to claim 9, wherein said predetermined phase angles are selected to provide a predetermined peak factor for said FDM system.

11. The apparatus according to claim 9 further comprising:

(a) means for down-converting said composite signal by using a predetermined and adjustable LO signal, made coherent with said coherent carriers, so as to shift said composite signal's spectrum to lower frequencies, thereby producing a composite IF signal.

12. The apparatus according to claim 9 further comprising:

(a) means for combining said composite IF signal with a synchronization signal whose predetermined frequency is coherent with those of said coherent carriers.

13. The apparatus according to claim 12 further comprising:

(a) means for processing said sampled composite data to resolve the phase angle of said synchronization signal in order to establish a fixed time reference point.

14. The apparatus according to claim 9, wherein said resolved phase angles represent the relative phase differences between two carrier components of said composite signal.

15. The apparatus according to claim 11, wherein said down conversion process further comprises:

(a) means for generating a pair of CW calibration signals, one serving as a calibration input signal and the other a calibration LO signal, each having a predetermined frequency made coherent with said carriers, and whose absolute phase relationship with respect to each other is also predetermined;

(b) means for configuring signal connections in a manner such that the said down-conversion process is performed exclusively using said calibration signals, thereby producing a calibration IF signal;

(c) means for combining said calibration IF signal with a synchronization signal made coherent with said calibration IF signal;

(d) means for digitally sampling said combined calibration IF signal and said synchronization signal at a predetermined sampling rate, made coherent with said calibration IF signal, so as to derive sampled calibration IF data;

(e) means for digitally processing said sampled calibration IF data to resolve the absolute phase angle of said calibration LO signal;

(f) means for configuring signal connections in a manner such that the said down-conversion process is performed on said composite signal using said calibration LO signal having a known absolute phase angle, thereby producing a composite IF signal;

(g) means for combining said composite IF signal with said synchronization signal made coherent with said composite IF signal;

(h) means for digitally sampling said combined composite IF signal and said synchronization signal at a predetermined sampling rate, made coherent with said composite IF signal, so as to derive sampled composite IF data;

(i) means for digitally processing said sampled composite IF data to resolve the absolute phase angle of at least one carrier component included in said composite IF signal; and (j) means for applying the said resolved absolute phase angle error signal to adjust the phase angle of said at least one carrier component so as to establish said at least one carrier component as an absolute signal to which subsequent relative phase angle measurements can be referenced, thereby effectively resolving the absolute phase angles of all carrier components included in said composite signal.

16. The apparatus according to claim 9, further comprising:

(a) means for initiating said digital sampling of said composite signal by the assertion of a trigger signal whose frequency is coherent with those of said coherent carriers; and (b) means for generating said trigger signal whose frequency equals an integral sub-harmonic of said predetermined fundamental frequency.

* * * * *